(12) United States Patent
Crivello

(10) Patent No.: US 7,091,254 B2
(45) Date of Patent: Aug. 15, 2006

(54) ANALYTICAL INSTRUMENTS FOR MONITORING PHOTOPOLYMERIZATION

(75) Inventor: James V. Crivello, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 11/088,653

(22) Filed: Mar. 24, 2005

(65) Prior Publication Data

US 2005/0182149 A1  Aug. 18, 2005

Related U.S. Application Data

(63) Continuation of application No. PCT/US03/30540, filed on Sep. 26, 2003.

(60) Provisional application No. 60/421,642, filed on Oct. 28, 2002, provisional application No. 60/414,001, filed on Sep. 26, 2002.

(51) Int. Cl.
*C08J 3/28* (2006.01)
*G01J 5/00* (2006.01)
*G01J 5/48* (2006.01)

(52) U.S. Cl. .............................. 522/1; 356/43; 356/44; 356/216; 427/10; 374/132; 250/341.2; 522/170

(58) Field of Classification Search .................. 522/1, 522/170; 356/43, 44; 427/10
See application file for complete search history.

(56) References Cited

U.S. PATENT DOCUMENTS

| | | | | |
|---|---|---|---|---|
| 3,524,983 A | * | 8/1970 | Voelz ....................... 250/341.6 |
| 4,582,520 A | * | 4/1986 | Sturm ......................... 65/382 |
| 4,874,948 A | * | 10/1989 | Cielo et al. ............... 250/341.5 |
| 4,984,902 A | | 1/1991 | Crowley et al. |
| 5,131,752 A | | 7/1992 | Yu et al. |
| 5,166,080 A | * | 11/1992 | Schietinger et al. ........... 438/7 |
| 5,183,597 A | | 2/1993 | Lu |
| 5,423,671 A | | 6/1995 | Imataki |
| 5,707,780 A | | 1/1998 | Lawton et al. |
| 5,769,540 A | * | 6/1998 | Schietinger et al. ........ 374/127 |
| 5,793,042 A | | 8/1998 | Quick |
| 6,268,403 B1 | | 7/2001 | Crivello |
| 6,374,150 B1 | * | 4/2002 | Redinbo et al. ............ 700/121 |
| 2005/0244975 A1 | * | 11/2005 | Rakow et al. ................ 436/85 |

OTHER PUBLICATIONS

Falk et al, "Monitoring Photopolymerization Reactions with Optical Pyrometry", J. Polymer Science: Part A: Polymer Chemistry, vol. 41, 579-596 (2003).*

(Continued)

*Primary Examiner*—Susan Berman
(74) *Attorney, Agent, or Firm*—Heslin Rothenberg Farley & Mesiti P.C.

(57) ABSTRACT

An apparatus for continuously monitoring a photopolymerization reaction in real time by optical pyrometry includes a housing having a chamber; a sample mount that may be disposed within the chamber; a light source for supplying light to induce a photopolymerization reaction in a monomer sample disposed on the sample mount; and an optical pyrometer that may be attached to the housing for measuring temperature of the monomer sample. The temperature of the sample with respect to time is used to monitor progress of the reaction. Another apparatus for monitoring a photopolymerization reaction combines optical pyrometry and infrared spectroscopy. The apparatus includes a sample mount disposed in a beam of an infrared spectrometer a light source for supplying light to induce a photopolymerization reaction in a monomer sample disposed on the sample mount and an optical pyrometer for measuring temperature of the monomer sample.

15 Claims, 13 Drawing Sheets

OTHER PUBLICATIONS

Falk et al, "Monitoring Photopolymerization Reactions with Optical Pyrometry", J. Polymer Science: Part A: Polymer Chemistry, vol. 41, 579-596, 2003.*

Crivello, et al "Photoinitiated Cationic Polymerization of Epoxy Alcohol Monomers", *Journal of Polymer Science*: Part A: Polymer Chemistry, vol. 38, pp. 389-401 (2000) XP-00226925.

* cited by examiner

ANALYTICAL INSTRUMENTS FOR MONITORING PHOTOPOLYMERIZATION

CROSS-REFERENCE TO RELATED APPLICATIONS

This application is a continuation of International Application No. PCT/US03/30540, filed on Sep. 26, 2003, which claims priority from U.S. provisional application, Ser. No. 60/414,001, filed Sep. 26, 2002, and U.S. provisional application, Ser. No. 60/421,642, filed on Oct. 28, 2002. The entire disclosure of each is incorporated herein by reference.

FIELD OF THE INVENTION

The invention relates to instruments based on optical pyrometry for monitoring the progress of various types of photopolymerization reactions.

BACKGROUND OF THE INVENTION

Photopolymerizations used in UV curing processes are increasingly important reactions that are currently widely employed in many large-scale commercial applications such as coatings, adhesives, printing inks, and photoresists. At the present time, the applications of photopolymerization are experiencing growth in excess of 10% annually. Typically, such polymerizations are conducted under irradiation with UV light in the absence of a solvent and typically proceed within the time frame of a fraction of a second to several minutes. Multifunctional monomers are most commonly employed and crosslinked polymer networks are obtained. As the technical applications of photopolymerizations have multiplied, there has been a corresponding interest on the part of both academic and industrial workers in the development of various methods by which these very rapid polymerization reactions can be monitored. Convenient, precise and reproducible analytical methods for following the course of photopolymerizations are crucial not only to the future research and development of this technology, but are also the key to insuring the photoresponse of currently available commercial products.

A considerable number of analytical techniques have been developed for monitoring the course of rapid photopolymerization reactions. Only a few of the most commonly used techniques are presented here. Probably the oldest analytical method that has been employed for the study of photopolymerizations is calorimetry carried out in specially modified bomb calorimeters. A more recent development is the use of differential scanning photocalorimetry (DSP). This technique involves the adaptation of a conventional differential scanning calorimeter by the addition of a light source and a quartz window to allow the irradiation of samples placed in the calorimeter. The evolution of the exothermic heat of the polymerization of the monomer is used to monitor the course of the reaction. DSC instruments equipped with irradiation modules are now available from several commercial sources.

From the inception of the discovery and development of photoinduced polymerizations, infrared spectroscopy (IR) was used as an important method for characterizing the polymers produced. However, the most recent seminal innovation in this area was the development of real-time infrared spectroscopy (RTIR) by Decker et al. to enable the continuous, rapid, and precise monitoring of the kinetics very rapid photopolymerizations. Initially, this technique involved the observation of a single absorption band characteristic of the functional group undergoing polymerization as a function of time. More recently, highly sensitive, Fourier transform spectrometers have become available that allow the acquisition of tens of complete spectra per second. Such spectrometers provide the ability to monitor several bands of complex mixtures of monomers undergoing polymerization at the same time. At this time, FT-RTIR appears to be the method of choice for the rapid, precise monitoring of photopolymerization reactions. A related technique, in-situ Raman spectroscopy, has also been applied to photopolymerizations. Fluorescence spectroscopy has also been used as a technique for following the kinetics of photopolymerizations.

Yet, despite the plethora of methods that have been used and developed to monitor the course of photopolymerization reactions, there is still a need for new methodology that provides additional information concerning these reactions. Such methods should also be rapid, reproducible and easy to implement. In addition, the apparatus used should also be relatively inexpensive. A Perkin-Elmer Differential Scanning Calorimeter equipped with an irradiation module costs approximately $150,000 while a FTIR equipped with a lamp source is priced in the range $20,000–30,000. No commercially available RTIR equipment is available. For this reason, a FTIR spectrometer must be purchased and then custom modified to provide FT-RTIR capability. Many users of UV cure technology are small companies that cannot easily afford these kinds of expenditures for such equipment. Therefore, there is a need for new techniques and instruments for monitoring UV curable formulations that not only meets the objectives set forth above, but also are comparatively inexpensive.

All addition photopolymerizations are exothermic events and, as mentioned previously, the technique of differential scanning photocalorimetry relies on this principle. However, DSP suffers from serious drawbacks that limit its usefulness apart from the inherent high cost of this instrumentation. Results are highly dependent on the sample size and configuration. For this reason, the data obtained is often poorly reproducible. Since it is an indirect method, DSP gives very little information about the actual chemistry that is taking place. On the other hand, RTIR provides an excellent monitoring of the chemistry that is taking place during the chemical reaction, but fails to provide information about the simultaneous changes in the environment and physical state of the sample. For example, as a photopolymerization proceeds, the temperature of the sample must rise during the reaction. Little information is available on the magnitude of the temperature increase or its effect on the kinetics and extent of the polymerization.

Although RTIR and DSP work well when they are employed for the polymerization of simple one- or two-monomer systems, they are less easily applied to systems in which more complex multicomponent mixtures of monomers of different reactivity are involved. Further, they are comparatively slow and labor-intensive, and employ expensive instrumentation. As a consequence, they are rarely employed in an industrial setting for the optimization of photocurable formulations. Accordingly, there is also a need for highly sensitive, versatile, rapid, reproducible and easy to use analytical instruments for monitoring photopolymerization.

Optical pyrometers have been employed for a wide variety of remote temperature sensing purposes. For example, they are used in the metals, glass and ceramics industries to determine the temperature of these molten and solid materials during the various stages of their processing. However, instruments based on an optical pyrometer have not heretofore been used in monitoring rapid photopolymerizations.

Optical pyrometers are small and inexpensive instruments that can be easily mounted in various modes and configurations to record temperature by measuring the infrared emission of a sample. Typically, they provide a wide temperature measurement range capability with an accuracy of ±1° C. Further, the temperature measurements are rapid and can be made on either a continuous or discontinuous mode. U.S. Pat. No. 5,707,780 discloses use of an optical pyrometer for determining relative degree of polymerization over time in developing materials for use in a solid imaging process. Samples were scanned by a laser in a pattern of parallel lines to induce polymerization. Surface temperature was measured by an optical pyrometer, recorded on a strip chart and the area under the curve was used to indicate relative degree of polymerization for various samples. U.S. Pat. No. 6,268,403, to the present inventor, describes determining the rate of polymerization using FTIR and states that temperature of the sample was recorded using an optical pyrometer. Neither reference suggests building a stand-alone instrument that is robust, inexpensive and easy to use, and could be used in an industrial setting.

SUMMARY OF THE INVENTION

It has now been discovered that an apparatus that incorporates an optical pyrometer to directly and remotely monitor the temperature of a monomer sample undergoing photoinduced polymerization as a function of time can meet the objectives and requirements outlined in the foregoing section. Accordingly, in one aspect, the present invention relates to an apparatus for continuously monitoring a photopolymerization reaction in real time by optical pyrometry. The apparatus includes a housing having a chamber; a sample mount disposable within the chamber; a light source for supplying light to induce the photopolymerization reaction in a monomer sample disposed on the sample mount; and an optical pyrometer attachable to the housing for measuring temperature of the monomer sample. Temperature of the sample with respect to time is used to monitor progress of the reaction. The apparatus may additionally include one or more of the following a fiber optic cable for transmitting light from the light source to the monomer sample disposed on the sample mount, a heater for heating the monomer sample, an optical filter which maybe disposed in the path of the transmitted light between the light source and the monomer sample, and/or one or more ports in the housing for supplying gas to the chamber. The optical pyrometer may also be connected to an output device for transmitting temperature data to a data storage device, and/or a system for retrieving and analyzing the temperature data from the data storage device.

In another embodiment, the invention relates to an apparatus for monitoring a photopolymerization reaction by optical pyrometry and infrared spectroscopy. The apparatus includes a sample mount disposable in a beam of an infrared spectrometer; a light source for supplying light to induce a photopolymerization reaction in a monomer sample disposed on the sample mount; and an optical pyrometer for measuring temperature of the monomer sample. The apparatus may additionally include a fiber optic cable for transmitting light from the light source to the monomer sample disposed on the sample mount, and/or optical filter disposable in the path of the transmitted light between said light source and the monomer sample.

DETAILED DESCRIPTION OF THE INVENTION

Figure 1:
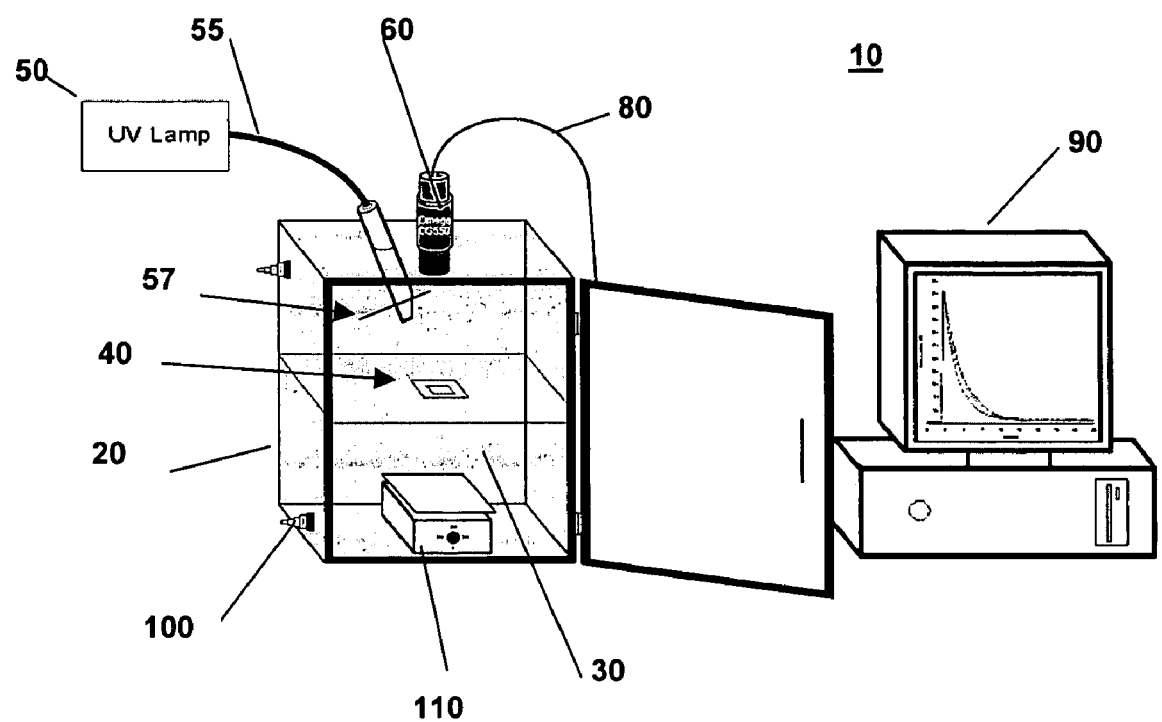
FIG. 1—Apparatus for the monitoring of photopolymerizations by optical pyrometry.

The present invention relates to an apparatus 10 for monitoring a photopolymerization reaction that includes an optical pyrometer, also known as an infrared thermometer. FIG. 1 illustrates a first embodiment of an apparatus according to the present invention. In the figure, a housing 20 supports and contains a monomer sample within a chamber 30. Housing 20 enables the photopolymerizations to be carried out in a controlled environment with minimal exposure to ambient light. The monomer sample is held by a sample mount 40 that is supported by housing 20. In some embodiments, the position of sample mount 40 may be adjusted.

A light source 50 supplies UV light to the monomer sample, and this light induces the photopolymerization reaction in the sample. The light source 50 may be of any type that can provide light of a wavelength and intensity sufficient to induce the polymerization, such as a UV lamp or a laser. In the figure, light source 50 is disposed outside housing 20, and light is transmitted from light source 50 and directed to the sample via fiber optic cable 55. In other embodiments, light source 50 may be disposed within chamber 30 and the sample may be directly exposed to the light. Where light source 50 is a laser, one or more mirrors and/or beam spreaders may be employed to deliver light to the sample. The UV irradiation may be triggered by hand using an electronic shutter or various means for opening and closing the shutter on a automatic or semi-automatic basis may be devised through the use of a timer-programmer. The figure also shows an optical filter 57 disposed in the beam of light directed onto the sample. One or more filters may be employed in apparatus 10, including band pass and neutral density filters, for selecting the wavelength for the irradiation and for adjusting intensity of the light impinging on the sample. Optical filter 57 may be supported by housing 20, as shown in the figure, attached to fiber optic cable 55 or held in the light beam by other suitable means.

Temperature of the sample is sensed by optical pyrometer 60, which is attached to housing 20 at a position above sample mount 40, although it may be placed at any position where the path between the two is not blocked and there is no interference from other optical beams, including light from light source 50. Temperature readings may be made in a discontinuous manner at a rate of one temperature measurement per second. However, optical pyrometers typically have the capability of continuous temperature measurement as well, and this mode of operation may be useful for extremely rapid polymerizations that proceed to completion within one second or less. Optical pyrometer 60 is connected through an output device, cable 80, to a computer system 90, which includes capacity for storing data from optical pyrometer 60 and retrieving and analyzing the data. The type of computer system used is not critical to the invention, and one of skill in the art can readily assemble a suitable combination of equipment.

In the instrument shown in FIG. 1, photopolymerization reactions may be run under ambient conditions of temperature and atmosphere, or these may be controlled as desired. The temperature within chamber 30 may be controlled by heater 100. Controlled heating is highly desirable where apparatus 20 is to be used for the purpose of determining the kinetics and activation energies of the polymerization reaction being examined. Temperature control may also be accomplished by other methods, for example, the sample stage may contain a heating element. Alternatively, the sample may be heated by hot air or via radiant heating from a heat source or via an infrared source. Housing 20 also includes a port 110 for supplying a gas to the chamber in order to carry out a photopolymerization under a specific inert or reactive atmosphere, or specific conditions of humidity. Thus, gases that are typically used to make up an atmosphere in which a sample is polymerized include inert gases, such as nitrogen or argon, or gases for controlling humidity in chamber 30, including water vapor and air having a controlled humidity level. Port 110 is adapted to pass any gas into the chamber. It should be noted the additional ports may also be included in housing 20 if desired.

Figure 2A:
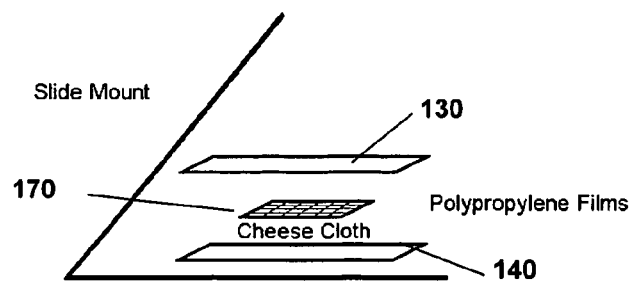
FIG. 2—Sample configuration employed for both optical pyrometry and combined optical pyrometry and FT-RTIR.
Figure 2B:
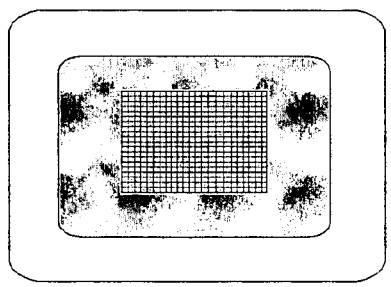

In one particular embodiment, UV light was generated by a UVEX Model SCU-110 mercury lamp and directed via a 95 cm liquid light pipe at an angle of 45° onto a horizontally mounted sample of the liquid monomer. The sample configuration is shown in detail in FIG. 2. The sample was sandwiched between two 10 μm oriented, corona treated poly(propylene) films (130 and 140) together with a spacer 170 to control the sample thickness. Poly(propylene) film was selected because it has a high thermal emissivity (emissivity coefficient ~0.95) and because it possesses IR absorption bands that do not interfere with the FT-RTIR analysis of the monomers (important for the simultaneous OP/FT-RTIR experiments to be described later). Cotton mesh was used as the spacer material, but other means of reproduceably setting the sample thickness may be used. The optical pyrometer was fixed perpendicular to the sample at a distance (15.2 cm) such that the focal point of the instrument is at the sample plane. Using a laser aligner, the focal point (3.9 mm dia.) of the OP instrument was centered in the middle of the sample window. Blank runs in which a non-polymerizing sample was present showed that the temperature rise obtained under direct, continuous UV irradiation was a maximum of 1° C. Thus, the light transmitted through the light pipe is composed only of wavelengths in the UV region with the transmission of little if any infrared irradiation. Temperature measurements were made at a rate of 1 measurement/sec and the data automatically transferred to a computer and displayed as a function of time.

Figure 3:
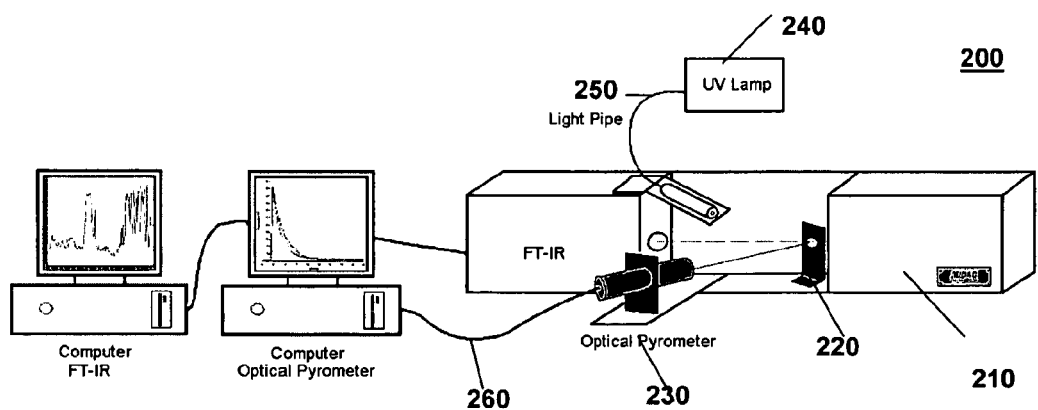
FIG. 3—Apparatus for simultaneous optical pyrometry and FT-RTIR.

In another embodiment, an optical pyrometer is combined with an infrared spectrometer to monitor a photopolymerization reaction. While OP gives considerable information about the temporal evolution of heat during the course of a photopolymerization reaction, it does not provide direct insight into the actual chemistry of the reaction that takes place. Therefore, in many cases, it is desirable to couple OP with an analytical technique such as FT-RTIR that allow the possibility of simultaneously correlating the information from both techniques on the same sample. The compact and remote sensing capability of OP make it possible to readily modify existing FT-RTIR equipment to provide this data. FIG. 3 depicts a schematic drawing of the configuration of the instrumentation that we have designed and employed in our investigations, embodied in apparatus 200. The key modifications of the FT-IR spectrometer 210 involved turning sample holder or mount 220 at a 45° angle to the beam of the instrument and mounting the OP instrument 230 perpendicular to the sample holder with the focus of the instrument at the sample plane, with light from a light source 240 directed to the sample at an angle. Since thin samples are used in these studies, the FT-RTIR measurements are not affected by changing the sample angle with respect to the analyzing beam. Moreover, using such a configuration, the OP temperature measurements are not complicated by interference from the IR laser beam of the infrared spectrometer. It should be noted that the particular angles indicated in FIG. 3 are not critical, and the three optical beams, of light source 230, optical pyrometer 240 and FTIR 220, may impinge on the sample at any angle as long as the beams do not interfere with each other.

An apparatus according to the present invention can provide both fundamental scientific and practical information concerning a wide variety of aspects of photopolymerizations employed for UV curing applications.

EXAMPLES

Descriptions of the apparatus and results obtained using optical pyrometry both as a stand-alone method and as a combined technique together with RTIR are presented. Some representative data obtained using these techniques is given for various monomer systems to demonstrate the utility of the instruments.

Materials

All the monomers and reagents used in this investigation were obtained from commercial sources and were purified prior to use by drying and distillation to remove inhibitors or other impurities. Alternatively, the inhibitors were removed from the monomers by passing them through a column of activated alumina. Cyclohexene oxide was stirred over calcium hydride and then distilled from calcium hydride prior to use. (3-Ethyl-3-oxetanylmethyl)phenyl ether (POX) and bis(3-ethyl-3-oxetanylmethyl)ether (DOX) were kindly provided by the Toagosei Chemical Co., (Nagoya, Japan). Triethylene glycol divinyl ether (DVE-3) was a gift of the International Specialties Corp. (Wayne, N.J.). 3,4-Epoxycyclohexylmethyl 3',4'-epoxycyclohexane carboxylate (ERL-4221E) was purchased from the Union Carbide Corp. (Bound Brook, N.J.). PC-1000 was kindly provided by the Polyset Co. (Mechanicville, N.Y.). Cationic photoinitiators, (4-N-decyloxyphenyl)-phenyliodonium hexafluoroantimonate (IOC-10) and (4-N-decyloxyphenyl)-diphenylsulfonium hexafluoroantimonate (SOC-10) S-dodecyl-S-methyl-S-phenacyl-sulfonium hexafluoroantimonate (DPS-$C_1C_{12}$) were prepared as described previously. The free radical photoinitiators Irgacure 819, Irgacure 651, Irgacure 2959 and Irgacure 184 were kindly supplied as samples from the Ciba-Geigy Corporation. The pigments were obtained from the indicated sources; Permanent Red 2B-220, Phthalo Blue 41611 from Peer Chemical Corp. (Wheeling, Ill.) and titanium dioxide from Kronos, Inc. (Houston, Tex.). The names, abbreviations and structures of the monomers and photoinitiators used in this investigation are displayed in Table 1.

Description of Instruments

Stand-Alone Optical Pyrometry (OP)

An unmodified Omega OS552-V1-6 Industrial Infrared Thermometer (Omega Engineering, Inc., Stamford, Conn.) equipped with a laser-sighting device (OS550-LS) was used in these studies. This instrument has a sensitivity of ±1° C. with an operating temperature range of −18 to 538 ° C. The optical pyrometer was used in a stand-alone configuration as depicted in FIG. 1. The pyrometer was that the sample is positioned perpendicular to and at the focal point of the sensor of instrument. At this location (15.2 cm from the infrared sensor), the focal spot diameter is 3.9 mm. Samples for kinetic analysis were prepared as follows: homogeneous solutions of the desired monomer with the designated photoinitiator were prepared (all concentrations are given in mol % with respect to the monomer unless otherwise noted). A 10 μm corona treated oriented polypropylene film was first laid down and a thin fiber mesh (cheese cloth was most often used) to serve as a spacer was placed on top of the plastic film. The liquid sample was placed onto this assembly and an identical layer of poly(propylene) film was placed over the top. In this manner, a reproducible liquid monomer layer amounting 0.912 mm was achieved. The resulting sample sandwich was mounted in a 2.0 cm×2.0 cm plastic slide holder and irradiated with UV light using a UVEX Model SCU-110 mercury lamp in which the light is carried through a flexible wand and directed onto the sample. The end of the wand was placed at a predetermined distance and directed at an incident angle of 45° onto the sample window. The intensity of UV irradiation was measured with a UV Process Supply Inc Control Cure Radiometer. All optical pyrometer experiments made in this investigation were conducted at ambient temperature (25–28° C.) at such light intensities as to permit a convenient analysis of the data. In every case, the samples were allowed to equilibrate and establish a flat baseline for 20 seconds prior to the start of the UV irradiation. Temperature data was collected at a rate of 1 measurement per second and directly recorded and downloaded to an IBM 350-P137 personal computer for analysis.

Unless otherwise indicated, the photopolymerization studies were conducted at ambient laboratory temperatures (24–28° C.). Studies of the effects of temperature on the photopolymerization were carried out by inserting a hotplate below the sample stage of the OP apparatus.

Combined Fourier Transform Real-Time IR Spectroscopy (FT-RTIR) and Optical Pyrometry FIG. 3 shows the configuration of the apparatus employed for simultaneous FT-RTIR and OP. The configuration of the FT-RTIR apparatus that we have used in our experiments is described in Crivello, J. V.; Liu, S. *J. Polym. Sci., Polym.; Part A; Chem. Ed.* 2000, 38, 389. A Midac M-1300 FT-IR spectrometer equipped with a liquid nitrogen-cooled mercury-cadmium-telluride detector was fitted with a UVEX Model SCU-110 mercury lamp in which the light is carried through a flexible wand to the sample compartment. The end of the wand was placed at a predetermined distance and directed at an incident angle of 45° onto the sample window. For these experiments, the sample window and holder were also tilted at a 45° angle to the infrared beam. The optical pyrometer was mounted such that it is perpendicular to the sample and located as described above at such a distance so as to place the focal point at the sample plane. Sample preparation was the same as described for the OP studies.

Both FT-RTIR and OP analytical methods were triggered at the same time by opening the shutter of the UV irradiation source. The FT-RTIR data were collected at a rate of one spectrum per second and the OP temperature data at the same rate. During the photopolymerization, a characteristic infrared absorption band of the functional group undergoing polymerization was monitored. Then, the conversion and thermal data were plotted together versus time using Midac Grams/386 and Excel software.

Representative OP Data

Reproducibility

Figure 4:
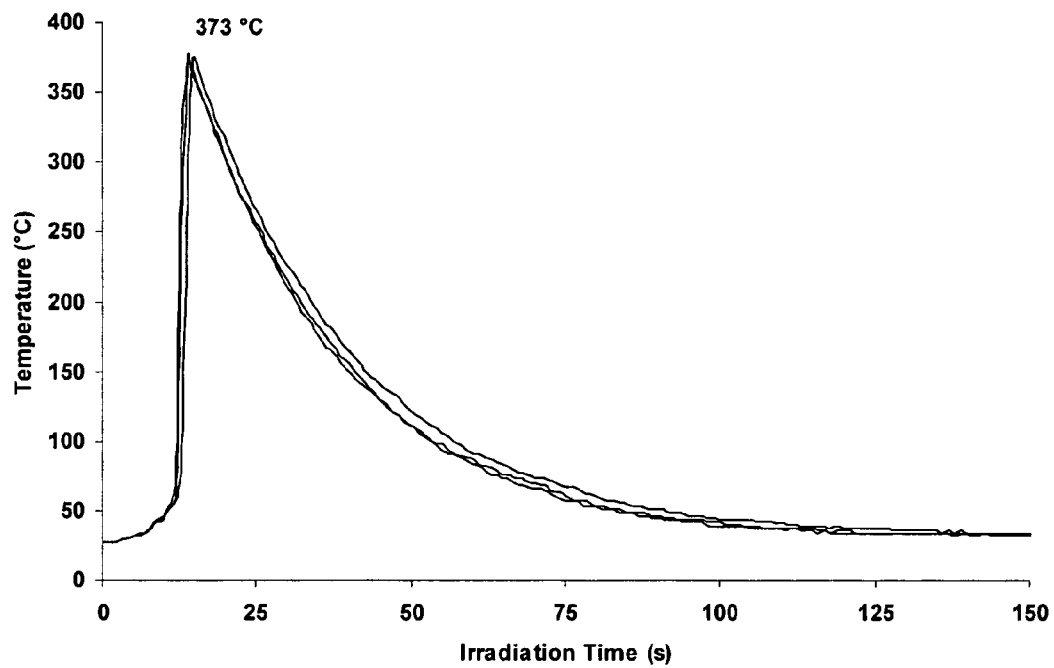
FIG. 4—Temperature profiles for the cationic photopolymerization of VCHDO with 1.0 mol % IOC 10 as photoinitiator (light intensity: 395 mJ/cm$^2$ min)

The run-to-run reproducibility of the thermal profiles of the photopolymerization was very good and the results for the peak temperatures and generally varied within a 5° C. range. FIG. 4 shows the temperature profiles for three separate photopolymerizations of 4-vinyl-1,2-cyclohexene dioxide (VCHDO) carried out in air using (4-N-decyloxyphenyl)-phenyliodonium hexafluoroantimonate (IOC 10) as the photoinitiator. As can be noted, the results are surprisingly highly reproducible. This very reactive monomer displays a very short induction period (3–5 s) followed by a very rapid rise to a maximum temperature of 373° C. Photopolymerization is followed by rapid cooling over the course of 120 seconds of the thin, low thermal mass sample to nearly room temperature. Under these conditions, some thermal decomposition of this monomer as indicated by a slight darkening of the crosslinked polymer film that is formed. The induction period is most likely due to inhibiting impurities remaining in the monomer even after purification as well as trace impurities introduced during the sample preparation. The sharp profile of the temperature versus time curve for this monomer suggests that the monomer is consumed rapidly and exhausted within a short time after the onset of the reaction.

Variation in Thickness

Figure 5:
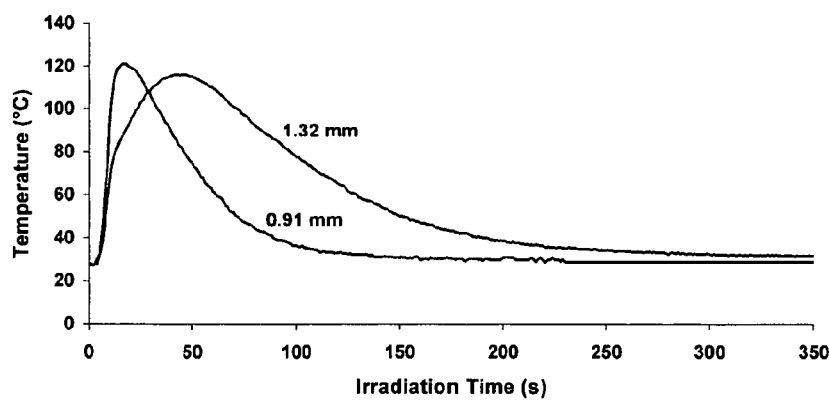
FIG. 5—Effect of thickness on the temperature during the cationic photopolymerization of PC-1000 using 0.25 mol % IOC 10 as photoinitiator (light intensity: 404 mJ/cm$^2$ min)

Shown in FIG. 5 is a study of the effect of variations in the thickness of a monomer film of the difunctional epoxide monomer, bis-1,2(2-(3,4-epoxycyclohexylethyl))-1,1,2,2-tetra-methyldisiloxane (PC-1000), on the reaction temperature. As the thickness of the liquid monomer sample increases, so also does the total amount of heat produced during the photopolymerization. At the same time, the area for the emission of IR energy detected by the pyrometer and available for cooling of the sample by air remains the same. The broadness of the exothermic peak increases markedly as a result of the longer time during which heat is released by the sample as well as the longer time required for cooling to occur.

Effects of Monomer Structure

Figure 6:
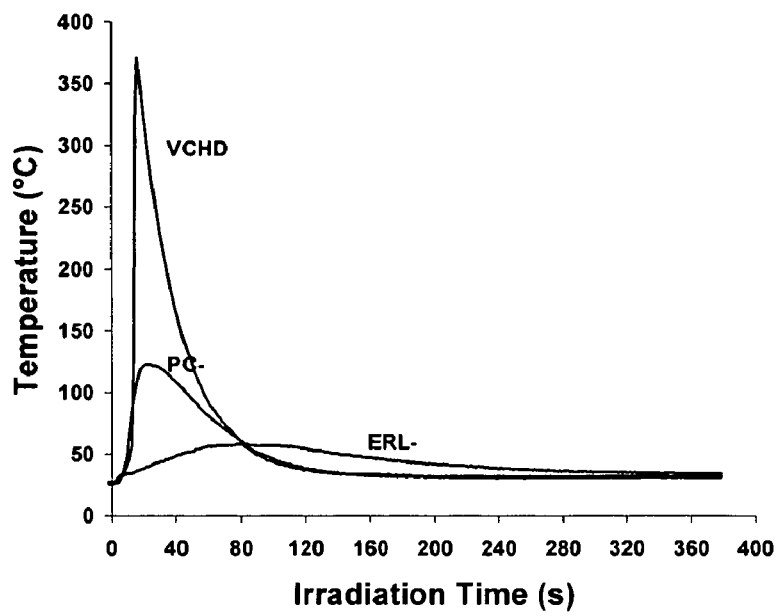
FIG. 6—Thermal profiles for the cationic photopoplymerizations of three different difunctional epoxide monomers. VCHDO, 0.25 mol %, 395 mJ/cm$^2$ min IOC 10; PC1000, 0.25 mol % IOC 10, 380 mJ/cm$^2$ min; ERL-4221E, 1.0 mol % IOC 10, 1100 mJ/cm$^2$ min.
Figure 7:
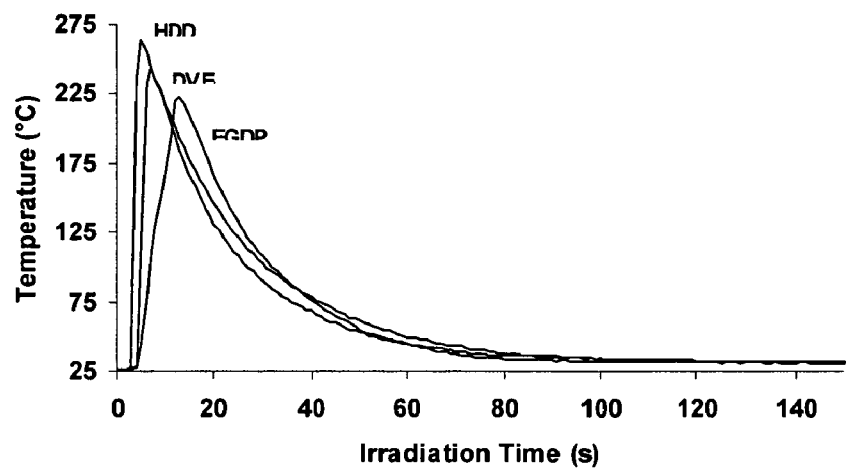
FIG. 7—Optical pyrometer study of the cationic photopolymerization of three vinyl and propenyl ethers in the presence of 0.25 mol % IOC 10 (light intensity: 392 mJ/cm$^2$ min)
Figure 8:
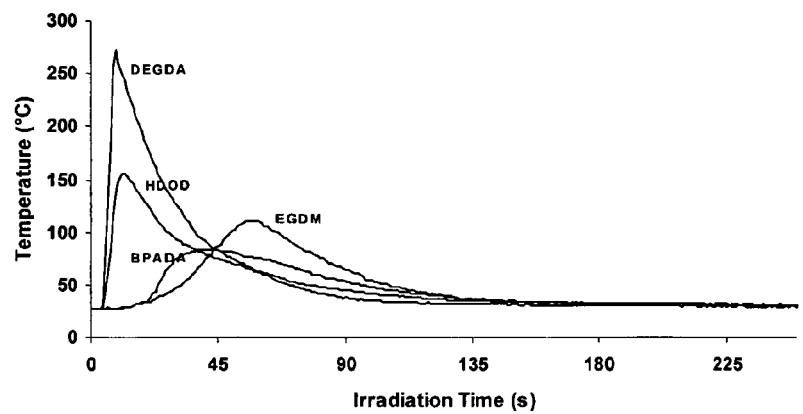
FIG. 8—Optical pyrometer study of the photopolymerization of four difunctional monomers by free radical photopolymerization using 1.0 mol % benzyl-1-cyclohexanol (Irgacure 184) as the photoinitiator (light intensity: 400 mJ/cm$^2$ min)

Investigations of the effects of the structure of various types of monomers on the thermal profiles of their photopolymerizations are depicted in FIGS. 6–8. Compared in FIG. 6 are the temperature profiles for the cationic epoxide ring-opening polymerizations of three different difunctional epoxide monomers. Again, IOC 10 was used as the photoinitiator in these studies. It is interesting to note that there are very large differences in reactivity between these three compounds that can all be classified as cycloalipatic epoxy monomers. At one extreme, VCHDO displays very high reactivity with a correspondingly highly exothermic polymerization even at a low light intensity and a low initiator concentration. In contrast, 3,4-epoxycyclohexylmethyl 3',4'-epoxycyclohexanecarboxylate (ERL-4221E), which is generally considered the "workhorse monomer" in many photocationic polymerization applications, displays rather sluggish evolution of heat that extends over several minutes. Since under these conditions, the photoinitiator undergoes complete photoinduced decomposition within the first minute or so of UV irradiation, the bulk of the observed reaction is a result of the slow cationic ring-opening polymerization that takes place by a non-photochemical process. To obtain an acceptable thermal response, ERL-4221E had to be photopolymerized using 1.0 mole % IOC 10 and at a light intensity of 1100 mJ/cm$^2$ sec. Under these conditions, the maximum temperature attained by the sample is only approximately 70° C. Clearly, run-away conditions are not observed for this monomer. Intermediate with respect to its activity is PC-1000. This silicon-containing monomer exhibits excellent response to UV-induced cationic photopolymerization together with a moderate temperature rise that avoids thermal and/or oxidative decomposition.

A comparison of the cationic vinyl photopolymerizations of two difunctional vinyl ethers (1,6-hexanediol divinyl ether, HDDV; triethylene glycol divinyl ether, DVE-3) and one difunctional propenyl ether monomer (ethylene glycol di-1-propenyl ether, EGDPE) is shown in FIG. 7. All three monomers are very highly reactive as can be seen by the sharp profiles of the temperature versus time curves. It is interesting to note that the di-1-propenyl ether appears slightly less reactive than the two difunctional vinyl ether monomers. The double bond of the former 1-propenyl ether monomer is more sterically hindered than the double bonds of the two vinyl ethers and it is probable that this accounts for the difference in the apparent reactivity of these two classes of monomers. It should be noted, that all three monomers displayed strong discoloration during photopolymerization indicating that thermal-oxidative decomposition also occurs as a result of the high temperatures attained by the sample during photopolymerization.

Temperature profiles for the free radical photopolymerizations of three diacrylate monomers and one dimethacrylate monomer are depicted in FIG. 8. Diethylene glycol diacrylate (DEGDA) is the most reactive monomer in this series. The maximum temperature reached by this monomer was 270° C. Less reactive is 1,6-hexanediol diacrylate (HDODA) and the adduct of bisphenol-A diglycidyl ether and acrylic acid (BPADGA). Since methacrylate monomers are generally less reactive than their acrylate counterparts, it is not surprising that ethylene glycol dimethacrylate (EGDMA) displays the lowest reactivity in this small series of monomers. The photoinduced free radical addition polymerization of multifunctional thiols and terminal unsaturated compounds (thiol-ene polymerizations) are exothermic and can also be easily monitored using the OP technique.

Oxygen Inhibition Effects

Figure 9:
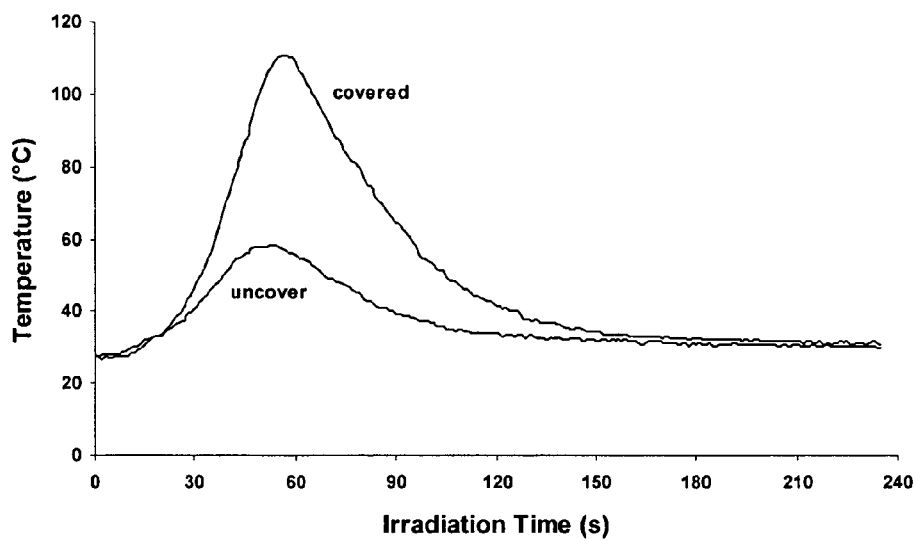
FIG. 9—Effect of presence (uncovered) and absence (covered) of oxygen on the photoinitiated free radical polymerization of EGDMA. (1.0 mol % Irgacure 184 as photoginitiator, light intensity: 400 mJ/cm$^2$ min)

FIG. 9 shows the well-known effect of oxygen inhibition in the free radical photoinitiated polymerization of EGDMA. Samples were prepared with and without a poly (propylene) cover film. Carrying out the polymerization in the presence of limited oxygen (covered) produces a much more rapid polymerization together with a greater evolution of heat than when oxygen is present. In contrast, the presence or absence of a cover film does not greatly affect the thermal profiles of the photoinitiated cationic polymerizations of typical epoxide monomers. A study in which the cationic photopolymerization of PC-1000 was carried out with and without a cover film. In this study, a peak temperature difference of 7 degrees was noted between the covered and uncovered samples. This was expected since cationic polymerizations are little affected by the presence or absence of oxygen. Since the onset of the photopolymerizations and slopes of the temperature rise are nearly identical, thermal transfer through the cover film must be rapid and most of the small difference observed between the two profiles can be attributed to heating of the cover film and slight variations in sample thickness.

Photoinitiator Efficiency

Figure 10:
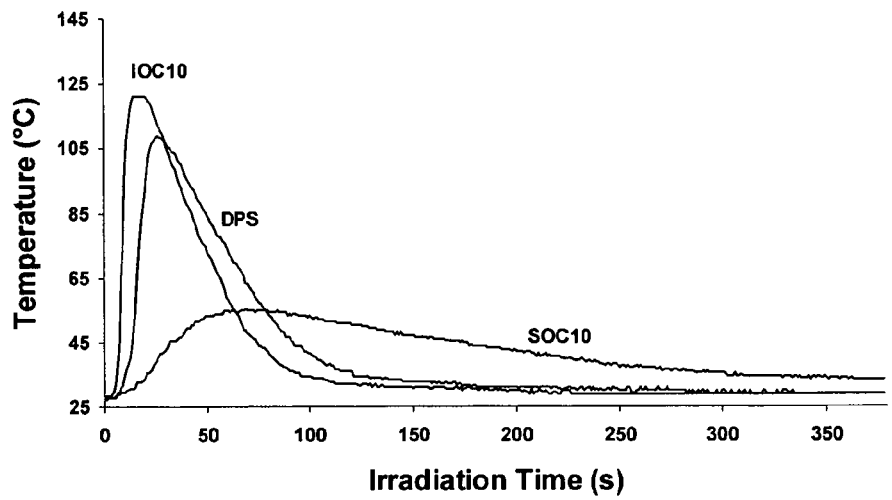
FIG. 10—Variation in the thermal profiles of the photopolymerization of PC-1000 using three different cationic photoinitiators (0.25 mol % photoinitiator, light intensity: 400 mJ/cm$^2$ min)
Figure 11:
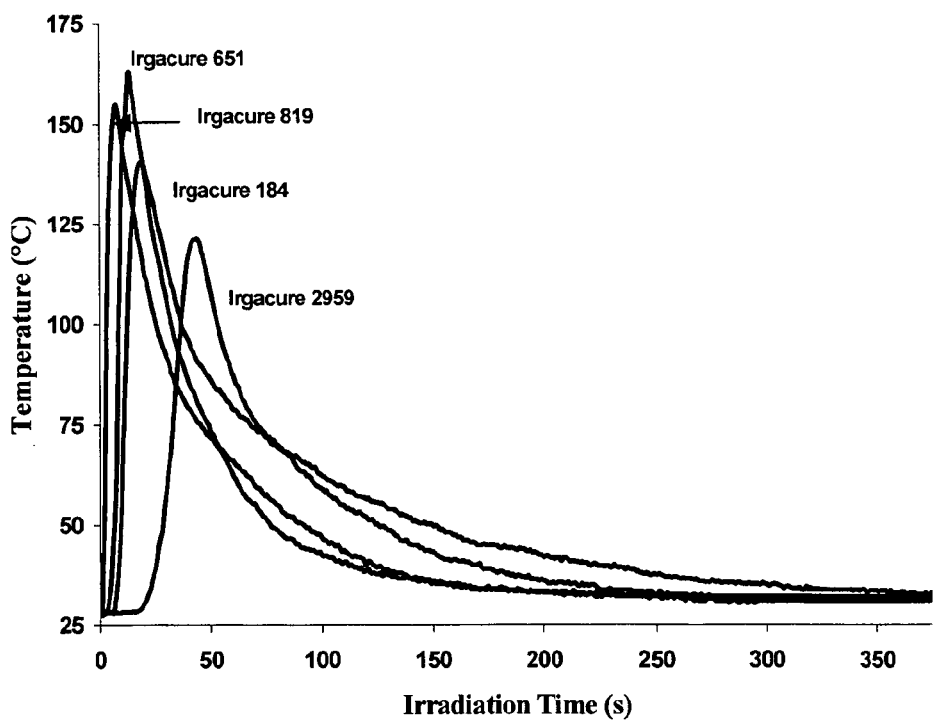
FIG. 11—Comparison of the reactivity of photoinitiators in the free radical polymerization of HDODA (1.0 mol % photoinitiator, light intensity: 423 mJ/cm$^2$ min)
Figure 12:
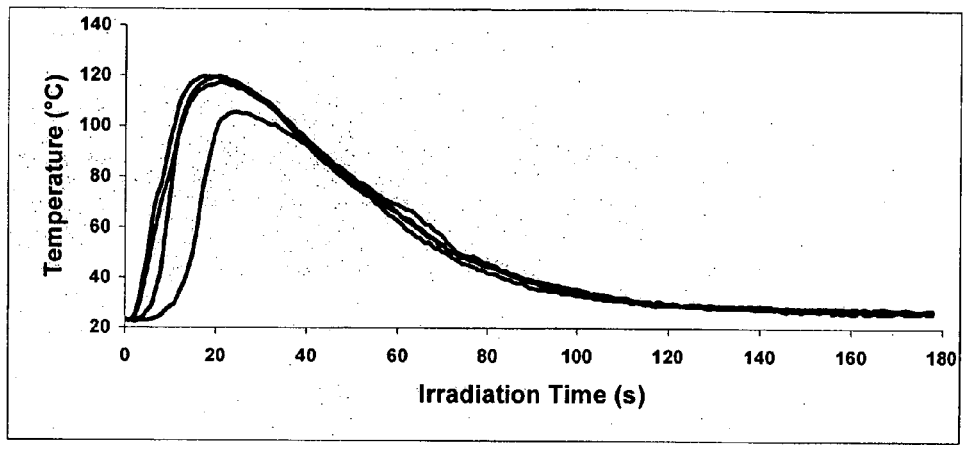
FIG. 12—Impact of photoinitiator (IOC 10) concentration on the cationic photopolymerization of PC-1000 (light intensity: 408 mJ/cm$^2$ min)

An assessment of the efficiency of a photoinitiator in a given photopolymerization can readily be ascertained using OP. An example is given in FIG. 10 in which various onium salt cationic photoinitiators were employed for the photopolymerization of PC-1000. The iodonium salt, IOC10 is much more active for the photopolymerization of this monomer than the sulfonium salt, (4-n-decyloxyphenyl)diphenylsulfonium hexafluoroantimonate (SOC10). S-n-dodecyl-S-methyl-S-phenacylsulfonium hexafluoroantimonate (DPS) displays intermediate behavior. A companion study is given in FIG. 11 in which three free radical photoinitiators are compared at the same concentration (1.0 mole %) in the photopolymerization of HDODA. The most efficient photoinitiator for this monomer was the bisacylphosphine oxide photoinitiator, Irgacure 819®, while the least efficient was the hydroxy ketone, Irgacure 2959®. The effect of the concentration of IOC 10 on the cationic photopolymerization of PC-1000 was examined and is shown in FIG. 12. Nearly identical results were observed at concentrations of 1.0 and 2.0 mol % of the photoinitiator. As the concentration is further reduced (0.25 and 0.10 mol %), the primary effect that is observed is a lengthening of the induction period. The results suggest that a fixed amount of inhibiting basic impurities are present in the monomer and that when the concentration of the photogenerated acid exceeds this threshold, polymerization sets in very rapidly.

Photosensitization

Figure 13:
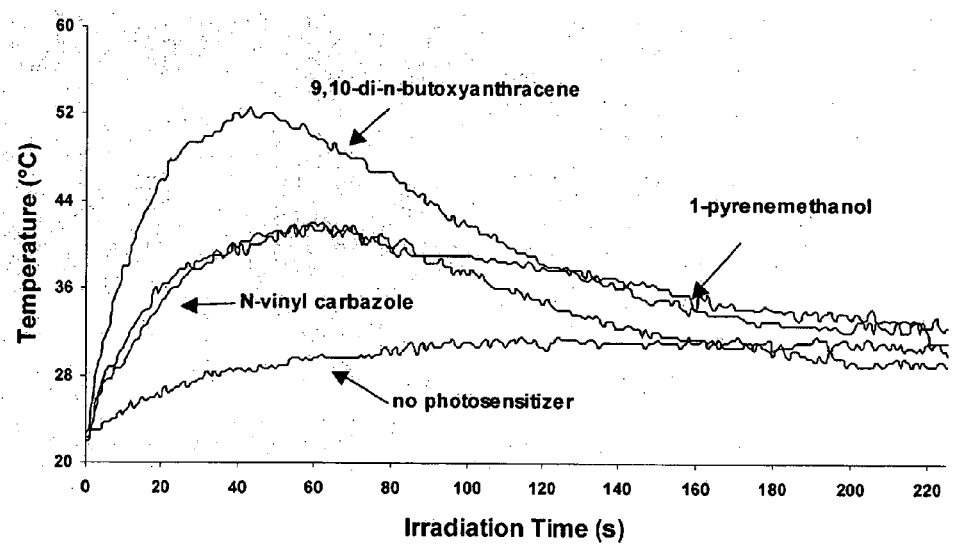
FIG. 13—Photosensitization of the polymerization of ERL-4221E by 1.0 mol % DPS in the presence and absence of 1.0 mol % three photosensitizers (light intensity: 1005 mJ/cm$^2$ min)

Photosensitization is an important process that is commonly used to enhance the spectral response of various photoinitiators. The application of photosensitizers also makes it possible to tailor the absorption of photopolymer systems to light sources such as lasers with narrow emission bands. Work in this laboratory has demonstrated that onium salt photoinitiated cationic epoxide ring-opening photopolymerizations can be effectively electron-transfer photosensitized by a wide variety of agents. example is shown in FIG. 13 in which the cationic photopolymerization of the bisepoxide, ERL-4221E was carried out in the presence of a dialkylphenacylsulfonium salt (DPS) as a photoinitiator photosensitized by three different photosensitizers: N-vinylcarbazole, 1-pyrenemethanol and 9,10-di-N-butoxy-anthracene. The thermal profile of the direct (i.e. non-photosensitzed) polymerization is included in FIG. 13 for comparison. The results demonstrate that in the presence of all three photosensitizers, the polymerization of this monomer is markedly accelerated. 9,10-Di-n-butoxyanthracene displays the greatest acceleration of three photosensitzers. The results suggest that acid generation from DPS is taking place more rapidly in the presence of the photosensitizers resulting in the production of a greater number of active centers than when DPS is employed alone.

Effects of Light Intensity and Temperature

Figure 14:
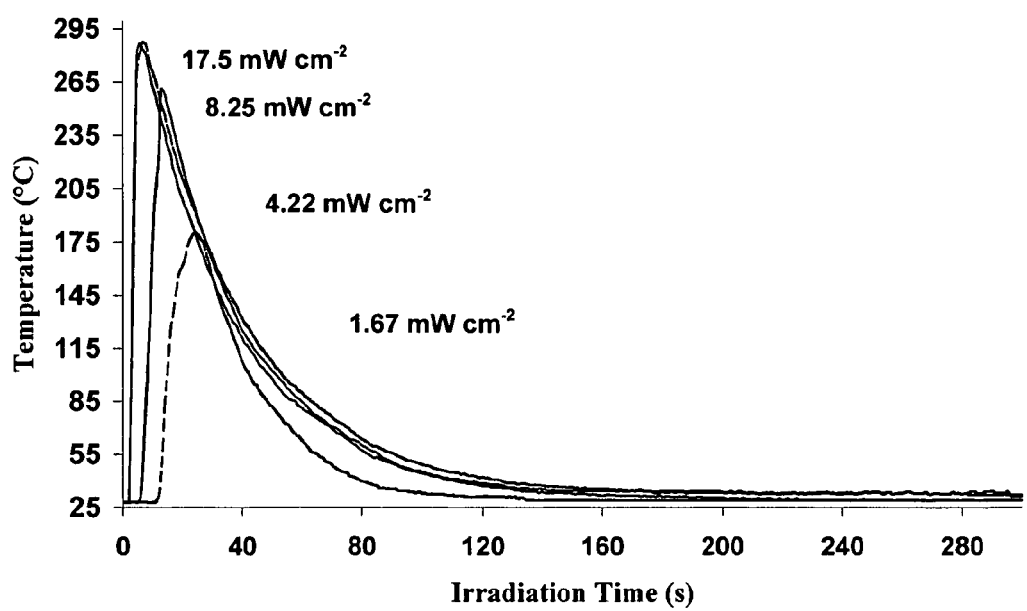
FIG. 14—Effect of light intensity on the photoinitiated polymerization of DEGDA (1.0 mol % Irgacure 184 as photoinitiator)
Figure 15:
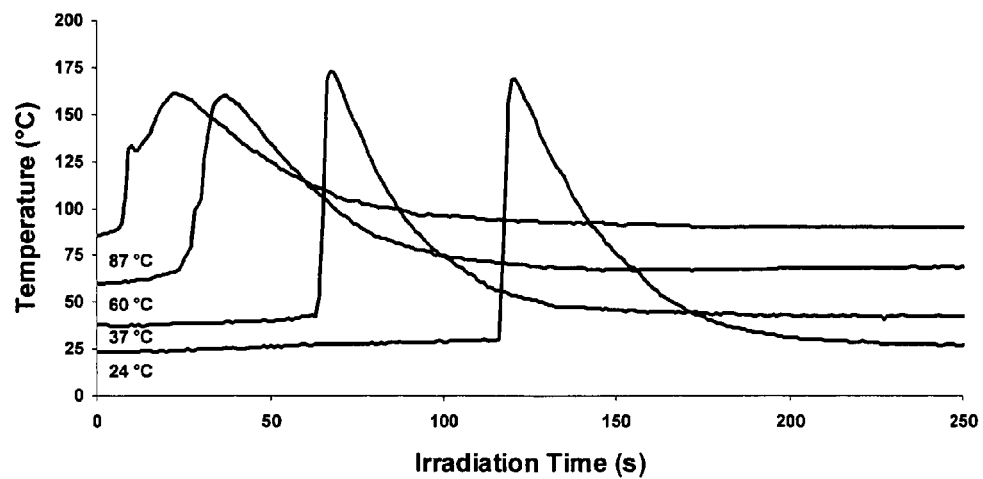
FIG. 15—Temperature effects on the photopolymerization POX using 1 mol % IOC 10 (light intensity: 403 mJ/cm$^2$ min)

Studies of the effects of light intensity and temperature on the photopolymerizations of two different monomer systems using OP are given in FIGS. 14 and 15. In FIG. 14 one can observe essentially the same thermal profiles for the free radical photopolymerization of DEGDA carried out at the two highest light intensities (17.5 and 8.25 mW cm$^{-2}$). When the light intensity is lowered first to 4.22 and then to 1.67 mW cm$^2$, the rate of heat evolution of this acrylate polymerization is correspondingly slowed as the rate of the reaction becomes light-limited. To examine the effect of temperature on a cationic ring-opening photopolymerization, the monomer, 3-ethyl-3-oxetanylmethyl phenyl ether (POX), was selected and the results are depicted in FIG. 15. It was observed and reported by Sasaki that the photoinduced cationic ring-opening polymerizations of POX and other similar oxetane monomers display long induction periods. This worker attributed the induction period to the slow rate of ring-opening of the oxetane ring. A proposed general mechanism for the polymerization of 3,3-disubstituted oxetanes is presented in Scheme 1. The results obtained and shown in FIG. 15, confirms the mechanism proposed by Sasaki. When photolysis of IOC 10 is carried out in POX at low initial temperatures (24° C.), one observes a very slow rise in temperature to 31° C. that takes place over the course of 120 seconds of continuous irradiation after which very rapid polymerization takes place. When the same polymerization is conducted at 37° C., a similar, very rapid polymerization takes place after 60 seconds irradiation. Under these conditions, it is expected that most of the photoinitiator has undergone photolysis prior to the onset of the polymerization. At this point, the reaction mixture consists of a metastable mixture of monomer together with the protonated oxetane. Once the thermal threshold for ring-opening is attained, polymerization ensues rapidly. In contrast, when the photopolymerization is carried out at higher temperatures (60 and 87° C.), there is already sufficient thermal energy present to exceed the activation energy for the ring-opening step and, as a result, polymerization takes place with a shorter induction period. However, these polymerizations take place much more slowly because fewer active initiating and propagating species are present giving rise to the observed broader time-temperature profiles. Lastly, when irradiation at room temperature is discontinued after one minute, the sample remains in the liquid state. However, when the sample is warmed slightly, rapid, exothermic polymerization takes place in the absence of light. Similar results were observed in the case of the difunctional oxetane bis(3-ethyl-3-oxetanylmethyl) ether (DOX) having a closely related structure.

Substrate Effects

Figure 16:
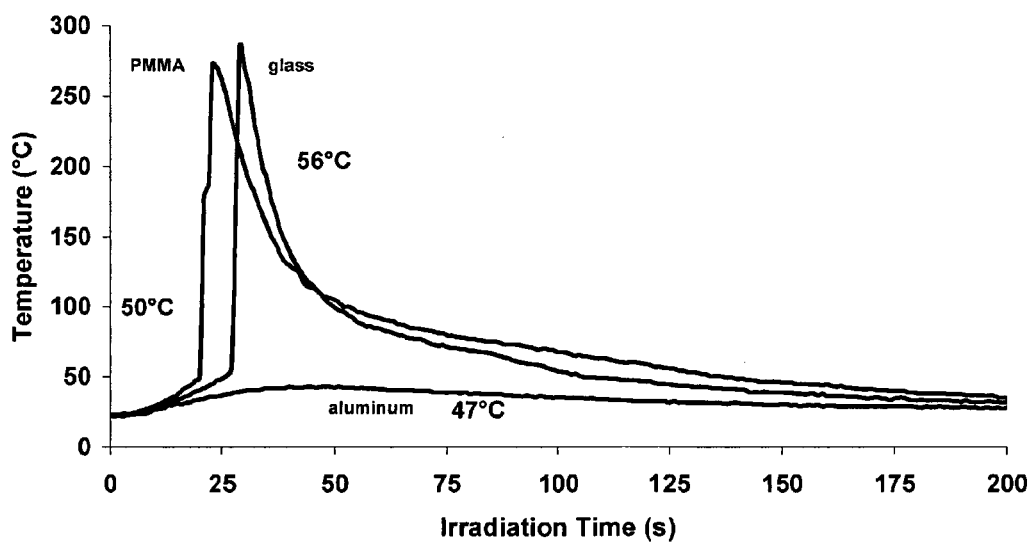
FIG. 16—Effect of different substrates on the photopolymerization of VCHDO with 20 mol % 4-methoxybenzyl alcohol carried out in the presence of 1.0 mole % IOC 10 (light intensity: 1006 mJ/cm$^2$ min.

Using OP, the effect of the type of substrate on the thermal profile of a photopolymerization reaction can be evaluated. In FIG. 16 is shown the temperature profiles for the cationic photopolymerization of VCHDO containing 20 mole % 4-methoxybenzyl alcohol as an accelerator carried out as thin (0.91 mm) films on three different substrates: poly (methylmethacrylate), glass and aluminum. While the thermal conductivity of plastic and glass are low (thermal coefficients: $8 \times 10^{-6}$ and $1.38 \times 10^{-2}$ W cm$^{-1}$K$^{-1}$ respectively), the thermal conductivity of aluminum is much higher (2.36×W cm$^{-1}$K$^{-1}$). The very rapid heat transfer in the sample deposited on aluminum permits only a small temperature rise (19 degrees) during the course of this photopolymerization. Thus, the polymerization proceeds very slowly over the course of the irradiation period. In contrast, due to the low thermal conductivities of poly (methyl methacrylate) and glass, the sample temperatures slowly reaches approximately 50 and 56° C. respectively at which thermal run-away conditions are established resulting in very high polymerization rates and temperatures. A study was also conducted in which the effect of the nature of the same three substrates was determined for the free radical photopolymerization of HDODA. Analogous, although less pronounced effects were observed with this monomer as compared to the above cationic ring-opening polymerization system.

Influence of Additives

Figure 17:
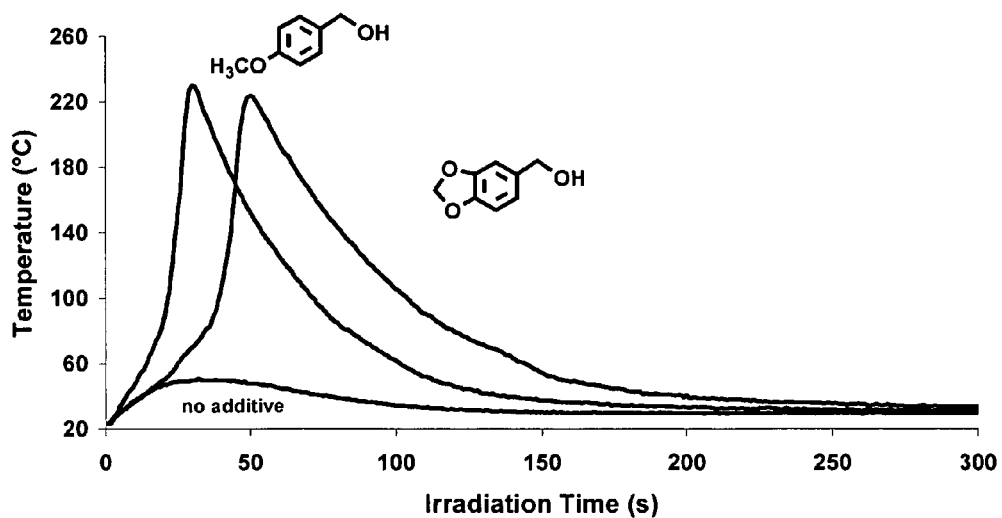
FIG. 17—Acceleration of the ring-opening epoxide polymerization of ERL-4221E in the presence and absence of 20 mol % benzylic alcohols (light intensity: 190 mJ/cm$^2$ min)
Figure 18:
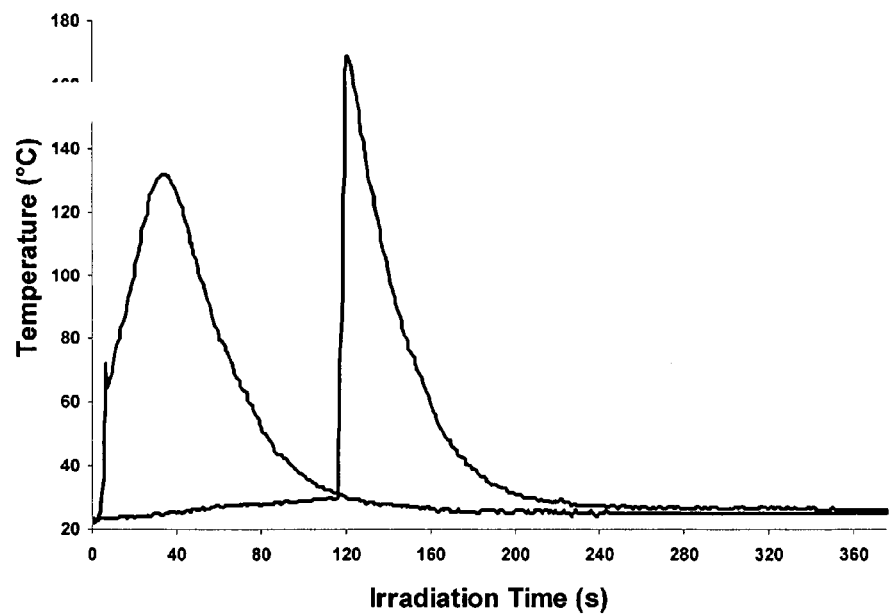
FIG. 18—Acceleration of the ring-opening polymerization of POX in the presence and absence of 10 mol % cyclohexene oxide (light intensity: 190 mJ/cm$^2$ min)

The effect of various rate modifying additives and substrates on practical photopolymerizations can also be assessed using OP. A few examples are presented here. Previously, we have reported that cationic epoxide photopolymerizations can be markedly accelerated in the presence of benzylic alcohols. FIG. 17 shows the effect of the addition of 20 mol % of two benzylic alcohols on the cationic ring-opening polymerization of ERL-4221E. As this figure shows, the normally sluggish polymerization of this monomer takes place under autoacceleration conditions in the presence of the added alcohols. While the maximum temperature of the photopolymerization of ERL-4221E in the absence of the alcohol additives reaches only 55° C., when the benzylic alcohols are present, the maximum temperature attained is in excess of 220° C. Vinyl ethers have also been observed to accelerate the photoinduced cationic polymerization of epoxide monomers. It has already been noted that the slow step in the cationic polymerization of POX is the ring-opening step. The addition of a small amount of a monomer such as cyclohexene oxide to POX should accelerate the polymerization by decreasing the otherwise long induction period. An OP study that confirms this supposition is displayed in FIG. 18.

Effects of Pigments and Fillers

Figure 19:
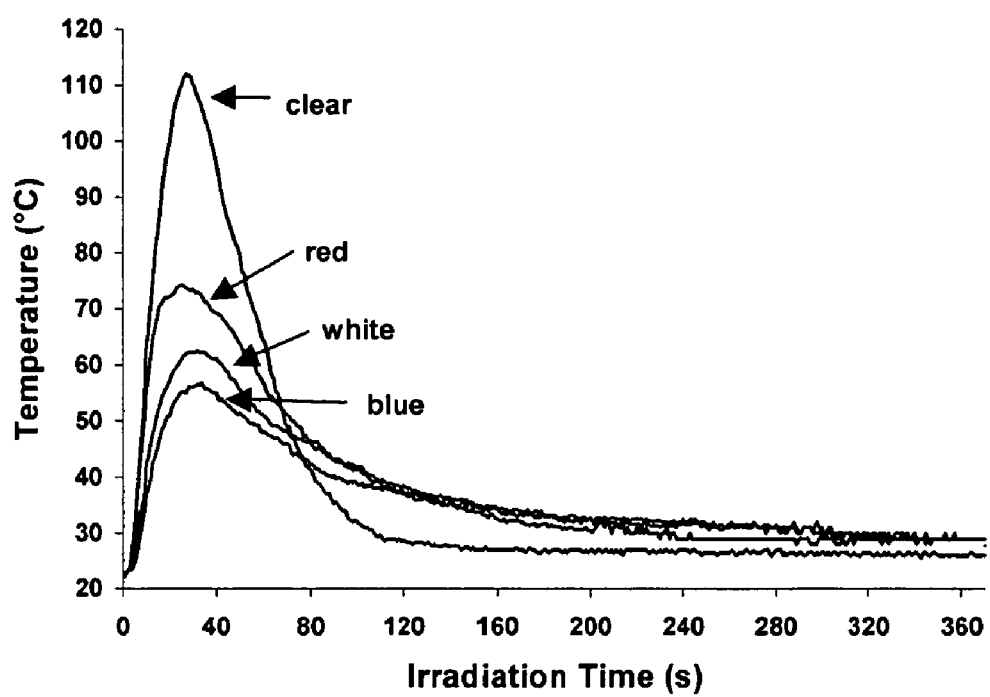
FIG. 19—Temperature profiles for the photopolymerization of PC-1000 in the presence of 1.0 mol % IOC 10 and 1.0 wt % three different pigments (light intensity: 396 mJ/cm$^2$ min)

The effects of pigments and fillers in photocurable printing inks and coating formulations can be conveniently monitored using the OP technique. Such a study is depicted in FIG. 19 in which 1.0 wt % of three different colored pigments were employed in the study of the cationic photopolymerization of PC-1000. A sample in which no pigment was added (i.e. clear) was included in this study for comparison. The addition of a pigment has the effect of appreciably slowing the rate of the photopolymerization through both screening and absorption of the UV irradiation. The degree to which these effects affect a photopolymerization depends on the type and color of pigment used. As a result, the maximum temperature reached during the polymerization is significantly lowered and the rate of heat evolution slowed. Both of these effects produced broader; more diffuse curves than observed for the sample containing no pigment. The addition of pigments to photoinduced free-radical polymerizations display very similar effects.

Data from Combined Optical Pyrometry and Fourier Transform Real-Time Infrared Spectroscopy (FT-RTIR/OP)

Figure 20:
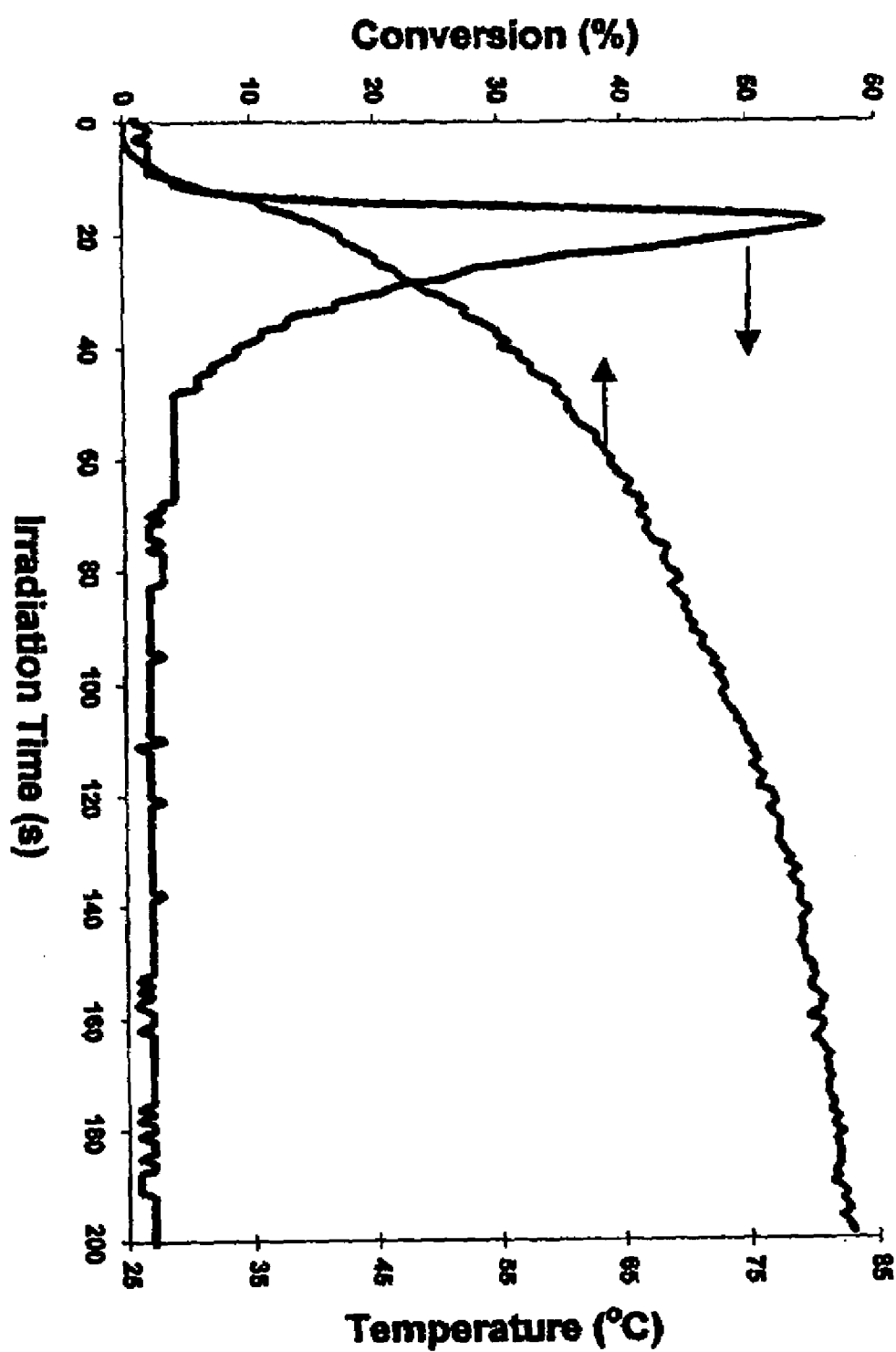
FIG. 20—Combined OP/FT-RTIR study of the photopolymerization of HDODA carried out in the presence of 1.0 mo % Irgacure 184 (light intensity: 350 mJ/cm$^2$ min)
Figure 21:
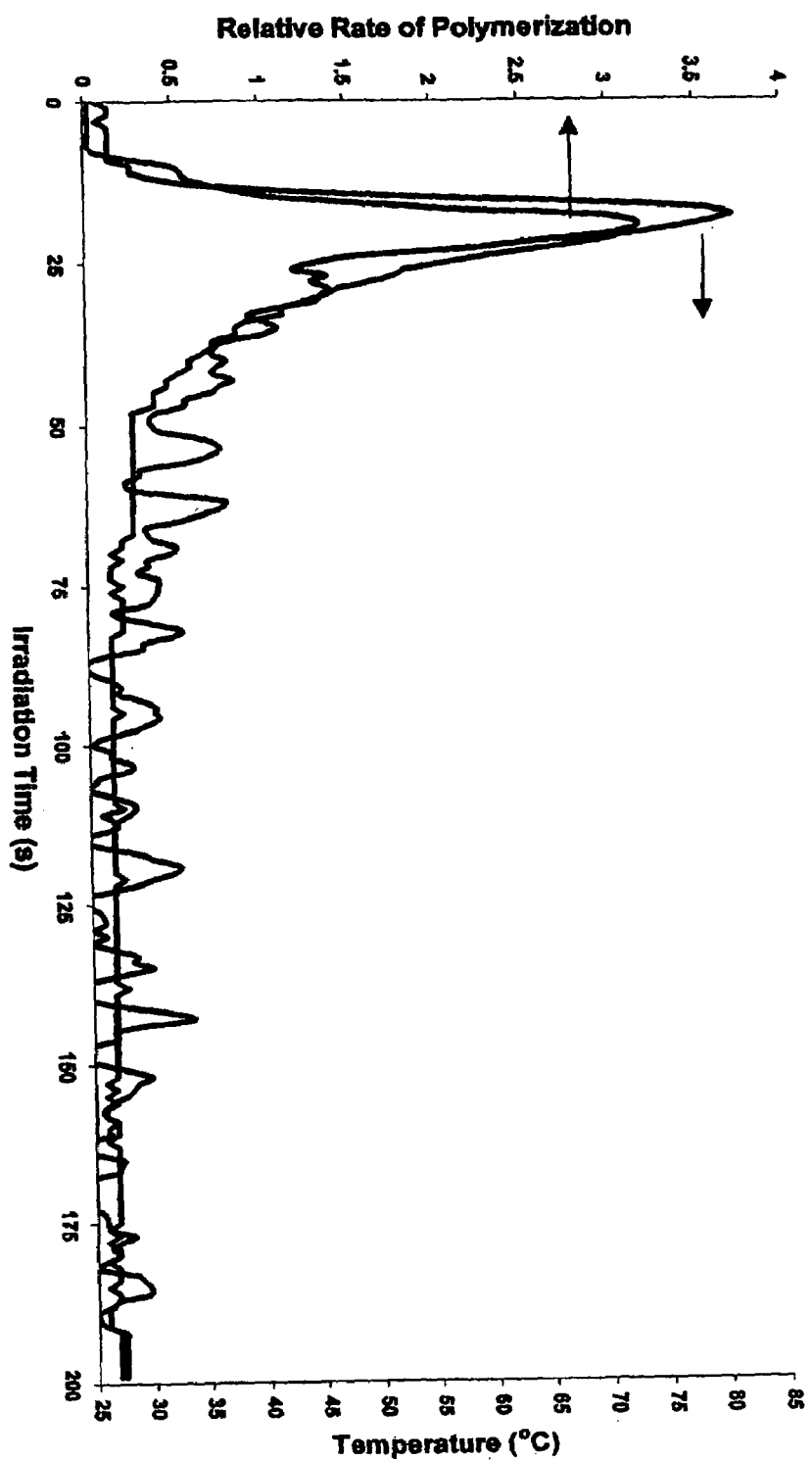
FIG. 21—Combined OP/FT-RTIR study of the photopolymerization of PC-1000 carried out in the presence of 1.0 mo % IOC 10 (light intensity: 350 mJ/cm$^2$ min).

The first study conducted using the combined FT-RTIR/OP technique is displayed in FIG. 20 in which the OP temperature versus time profile is overlaid with a conversion versus time curve for the FT-RTIR for the cationic photopolymerization of HDODA. A direct relationship between the two curves can be noted. That is; as the monomer is consumed during the photopolymerization, the temperature rises dramatically. When the monomer is exhausted, the temperature begins rapidly to fall. A second study shown in FIG. 21 depicts the OP temperature profile for the photopolymerization of PC-1000 overlaid with the derivative of the conversion versus time curve for this same polymerization as determined by FT-RTIR. There is rather striking resemblance between the general profiles of the two curves. The maxima of the two curves occur at nearly the same time except for a slight displacement of the OP curve to longer irradiation time. This is expected since there is a slight delay caused by the thermal transfer from the monomer through the inert poly(proplyene) film to the surface of the sample.

In addition to the many applications of the OP and OP/FT-RTIR methods described above, these devices can be used for several additional purposes. For example, the instruments can be employed as scientific tools to examine the effects of various reaction parameters on the kinetics of a photopolymerization reaction. The photopolymerizations that can be monitored comprise both free-radical and cationic photopolymerizations. In addition, as shown in the examples provided, they can also be used to follow the kinetics of free radical induced thio-ene reactions. Essentially any reaction that is either exothermic or endothermic may be monitored using these simple devices to obtain the reaction kinetics. The addition of a module that allows the photopolymerizations to be carried out under controlled temperatures would also permit the determination of their activation energies. Further use of these devices may be made in industrial processes to optimize UV curable product formulations. This is especially important for high speed, continuous, web-based applications such as paper, metal and glass coatings, for printing inks and for the application and cure of adhesives. Such formulated products are often optimized to minimize the UV exposure time required for cure. Typically, these formulations are multicomponent mixtures designed to not only cure rapidly, but also to perform specified highly tailored functions. A final application of the instruments described above is for quality control/product assurance. Using optical pyrometry, a characteristic temperature versus time profile of a UV curable product can be obtained. This curve contains several important parameters of interest: 1) the characteristic induction period; 2) the maximum temperature reached by the polymerization reaction; and 3) the time required for attainment of the maximum temperature. If the configurations of the devices are maintained constant as well as the irradiation wavelength and intensity and the temperature, these three parameters will also remain constant. Thus, it will be possible use OP or the combination OP/FT-RTIR to rapidly evaluate batches of UV curable formulations during and after manufacture and on standing in storage. Comparison with standards will provide manufacturers of these formulations a means for quality control/product assurance.

The invention claimed is:

1. A method for continuously monitoring a photopolymerization reaction in real time by optical pyrometry, said method comprising:
   providing an apparatus (10) comprising
      a housing (20) having a chamber (30);
      a sample mount (40) disposable within said chamber (30);
      a light source (50) for supplying light to induce a photopolymerization reaction in a monomer sample disposed on said sample mount (30); and
      an optical pyrometer (60) attachable to said housing (20) for measuring temperature of the monomer sample;
   disposing a sample comprising a photopolymerizable composition within chamber (30);
   exposing the sample to light from light source (50) to induce a photopolymerization reaction in the sample; and
   monitoring progress of the reaction by measuring temperature of the sample with respect to time.

2. A method according to claim 1, wherein apparatus (10) additionally comprises a fiber optic cable (55) for transmitting light from the light source to the monomer sample disposed on the sample mount.

3. A method according to claim 1, wherein sample mount (40) is adjustably supported by housing (20).

4. A method according to claim 1, wherein apparatus (10) additionally comprises at least one optical filter (57) disposable in the path of the transmitted light between said light source (50) and the monomer sample.

5. A method according to claim 1, wherein optical pyrometer (60) is connectable to an output device (80) for transmitting temperature data to a data storage device.

6. A method according to claim 5, wherein apparatus (10) additionally comprises a system (90) for retrieving and analyzing the temperature data from the data storage device.

7. A method according to claim 1, wherein housing (20) comprises at least one port (100) for supplying gas to the chamber.

8. A method according to claim 1, wherein apparatus (10) additionally comprises a heater (110) for heating the monomer sample.

9. A method according to claim 1, wherein the sample mount additionally comprises a spacer (170) for controlling thickness of a monomer sample disposed thereon.

10. A method according to claim 8, wherein sample mount (40) comprises a first (130) and a second transparent film (140) separated by said spacer (170), wherein said sample mount (40) is adapted to contain a monomer sample between the first (130) and the second transparent film (140).

11. An apparatus (10) for continuously monitoring a photopolymerization reaction in real time by optical pyrometry, said apparatus comprising:
- a housing (20) having a chamber (30);
- a sample mount (40) disposable within the chamber (30) and comprising a spacer (170) for controlling thickness of a monomer sample disposed thereon;
- a light source (50) for supplying light to induce a photopolymerization reaction in the monomer sample;
- a fiber optic cable (55) for transmitting light from the light source to the monomer sample;
- an optical pyrometer (60) attachable to the housing (20) for measuring temperature of the monomer sample;
- an output device (80) for transmitting temperature data from the optical pyrometer to a data storage device; and
- a computer system (90) for retrieving and analyzing the temperature data from the data storage device;

wherein temperature of the monomer sample with respect to time is used to monitor progress of the reaction.

12. An apparatus according to claim 11, wherein housing (20) comprises at least one port (100) for supplying gas to the chamber.

13. An apparatus according to claim 11, additionally comprising a heater (110) for heating the monomer sample.

14. An apparatus according to claim 11, wherein sample mount (40) is disposable in a beam of an infrared spectrometer and the temperature of the monomer sample with respect to time and change in the infrared spectrum of the monomer sample with respect to time are used simultaneously to monitor progress of the reaction.

15. An apparatus according to claim 11, additionally comprising at least one optical filter disposable in the path of the transmitted light between said light source and the monomer sample.

* * * * *